8856X
E. WARREN.
Thrashing Machine.
Patented May 29, 1835.
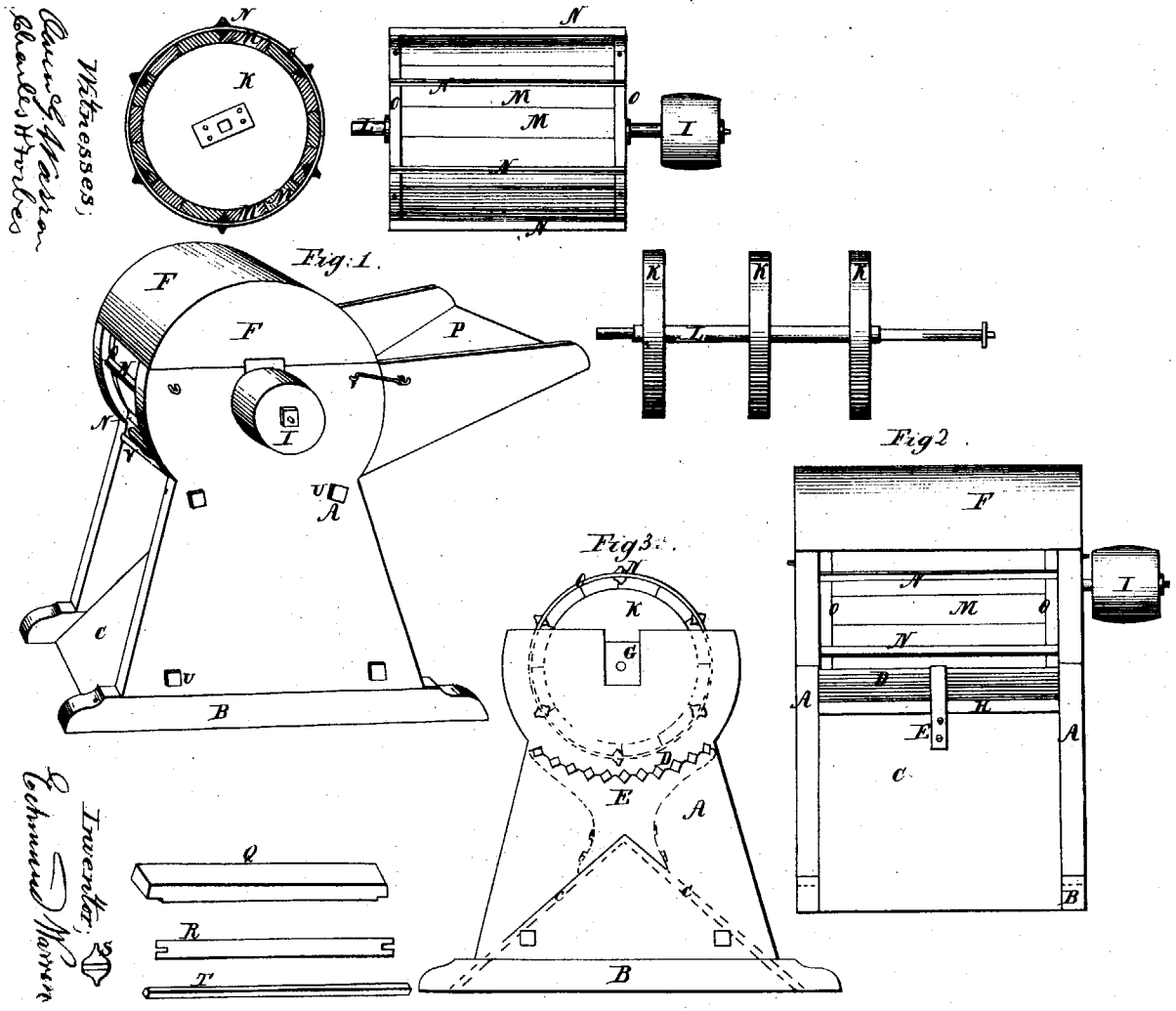
N. PETERS, Photo-Lithographer, Washington, D. C.

May 29. 1835 8856X 61

Edmund Warren
Letters Patent

The Schedule referred to in these Letters Patent and making part of the same containing a description in the words of the said Edmund Warren himself of his improvement in the thrashing machine for small grain & seed.

A Machine for thrashing wheat and other small grain & seed. This machine is constructed of a frame of wood ^or iron two feet wide or less according to the quantity to be thrashed in a given time. The sides are about three feet high, wide at the bottom and may be narrow at the top; two boards or plates are placed across from one side to the other, put together nearly at right angles, the point of the angle being up and spreading at the base about thirty inches. These brace boards are set in grooves in the centre of the machine (the sides of the machine are attached to bed pieces,) over the centre of this right angle a concave of bars is set of about a quarter of a forty inch circle, the upper edges of the concave being of equal height. These concave bars pass from side to side, and two of them are used to hold the machine together, and two other bolts are put through at the base of the angles, a sort of triangle of iron is placed under the concave and rests on the point of the right angle, to support the bars which are about four inches above the centre point of said angle the number of the acting edges of the concave should be about eleven. The top of the sides is formed circular or square with a covering on the same, the covering is the support of the two sides where they are sawed off. about nine inches above the concave bars; and sliding boxes are let into the centre of each side to suspend the cylinder in, these boxes are allowed to rise perpendicularly into the cap about one inch the top of them is hollow. the size of the cap and circle of the concave here described is designed for a fourteen inch (diameter) cylinder. A cylinder is formed of light heads or rounds upon a shaft, about three in number, and is covered by about one and one fourth inch heavy wood or iron amounting to the same weight. the diameter from twelve to eighteen inches according to the motion to be given. beaters about six in number one and one half inch wide &

8856X about one inch thick with two edges are set into the cylinder about five eighths of an inch with a flange through a mortice in the centre, secured with screws and fastened with a hoop at each end.. these are designed to be reversed with the inner edge out when much worn on the outer side. the edges are about one eight of an inch thick - a table or board is made to slide in grooves on either side up to the concave to pass the unthrashed grain under the cylinder from either side: the shaft of the cylinder has a whirl to receive a belt or band, and from any power is put in motion as high as fourteen or sixteen hundred revolutions a minute, and the largest about eight or ten hundred a minute.

The claims in this are the form of the frame made of two pieces of timber or plates for the sides, and two for the crosswork which are so arranged as to permit the grain to pass in or out at either side which self sharpen the beaters and make a strong and cheap frame, also the principle of reversing the beaters; also the concave of equal height on both sides which carries the straw, or throws it fifteen feet from the machine, and saves the work of a man to clean it away from the machine.

Witnesses

Exd. J. Huffpardy
MJC. H. B. Chapman

Edmund Warren (Patented May 29th 1835) (686 words)

(Drawing)